US011327261B1

(12) United States Patent
Perham et al.

(10) Patent No.: US 11,327,261 B1
(45) Date of Patent: May 10, 2022

(54) STRUCTURAL ARRANGEMENTS USING CARBON FIBER BRAID

(71) Applicant: Space Systems/Loral, LLC, Palo Alto, CA (US)

(72) Inventors: Maxwell Perham, Los Altos, CA (US); Kevin Ziemann, Lockeford, CA (US); Michael Freestone, El Granada, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 0 days.

(21) Appl. No.: 16/855,483

(22) Filed: Apr. 22, 2020

(51) Int. Cl.
*G02B 6/44* (2006.01)
*G01D 5/26* (2006.01)

(52) U.S. Cl.
CPC .......... *G02B 6/4432* (2013.01); *G01D 5/268* (2013.01)

(58) Field of Classification Search
CPC ...................................................... G01D 5/268
See application file for complete search history.

(56) References Cited

U.S. PATENT DOCUMENTS

| 5,164,129 A | 11/1992 | Douglas |
| 5,686,930 A | 11/1997 | Brydon |
| 5,991,479 A | 11/1999 | Kleinerman |
| 6,454,251 B1 | 9/2002 | Fish |
| 7,154,081 B1 | 12/2006 | Friedersdorf et al. |
| 7,277,162 B2 | 10/2007 | Williams |
| 8,463,096 B2 * | 6/2013 | Weimann ................. G02B 6/44 385/112 |
| 9,221,555 B2 | 12/2015 | Hinnant, Jr. et al. |
| 9,834,409 B2 | 12/2017 | Kere et al. |
| 10,170,219 B2 * | 1/2019 | Willemoes ............. H01B 9/005 |
| 10,326,209 B2 | 6/2019 | Freestone et al. |
| 2004/0113863 A1 | 6/2004 | Stonier |
| 2009/0208684 A1 | 8/2009 | Dunleavy et al. |

FOREIGN PATENT DOCUMENTS

| CN | 105040492 A | 11/2015 |
| EP | 0 586 707 A1 | 3/1994 |
| JP | 2003048600 A | 2/2003 |

* cited by examiner

*Primary Examiner* — John Bedtelyon
(74) *Attorney, Agent, or Firm* — Weaver Austin Villeneuve & Sampson LLP

(57) ABSTRACT

A composite fiber braid arrangement includes at least one fiber optic sensor embedded in a polymer resin. The polymer resin encloses a tow formed from an untwisted bundle of graphite fibers, and the untwisted bundle, together with the polymer resin, is enclosed by an outer jacket comprised of relatively dry, non-resin-impregnated, graphite fibers. Techniques for controlling alignment of an assembly of structural members, each structural member including such a fiber braid arrangement are also disclosed.

13 Claims, 6 Drawing Sheets

Detail A

Detail B

Detail C

Detail D

Detail E

STRUCTURAL ARRANGEMENTS USING CARBON FIBER BRAID

TECHNICAL FIELD

This invention relates generally to structural arrangements, and more particularly to techniques for forming a rigid structure including a number of structural members, where the structural members include a carbon fiber braid that, when uncured, is highly flexible and may be compactly stored. Structural members may be formed from the fiber braid and then rigidized by curing the carbon fiber braid.

BACKGROUND OF THE INVENTION

The assignee of the present invention manufactures and deploys spacecraft for, inter alia, communications and broadcast services.

Spacecraft structures, including particularly radio frequency (RF) antenna reflectors, are required to be compatible with launch loads, and must also comply, subsequent to launch, with challenging performance specifications in the face of substantial temperature variations and radiation exposure, typical of a space environment. Furthermore, such structures must be designed in view of stringent mass and cost objectives.

Composite structures for such applications have been described, for example, in U.S. Pat. No. 5,686,930, and U.S. Pat Pub. 2004/0113863, assigned to the assignee of the present invention. Lattice structures employing graphite fiber reinforced polymer (GFRP) yarn or tow have been developed by the assignee of the present invention, particularly in U.S. Pat. No. 10,326,209.

SUMMARY

According to some embodiments, an apparatus includes a composite fiber braid arrangement, the arrangement including at least one fiber optic sensor embedded in a polymer resin. The polymer resin encloses a tow formed from an untwisted bundle of graphite fibers, and the untwisted bundle, together with the polymer resin, is enclosed by an outer jacket comprised of relatively dry, non-resin-impregnated, graphite or aramid fibers.

In some examples, a coefficient of friction of the outer jacket may be substantially lower than a coefficient of friction of the bundle of graphite fibers.

In some examples, the bundle of graphite fibers may be over-impregnated with resin such that, during cure, the resin is configured to permeate the outer jacket.

In some examples, the outer jacket may be configured as a braided sheath of graphite or aramid fibers.

In some examples, the apparatus may include a high resistivity metal wire embedded in the polymer resin. In some examples, the high resistivity metal wire may be a shape memory alloy.

In some examples, the optical fibers may be configured as data transmission lines.

According to some embodiments, a method of curing a composite fiber braid arrangement, where the arrangement includes at least one high resistivity metal wire and at least one optical fiber embedded in a polymer resin, includes heating the high resistivity metal wire by applying an electrical potential across a length of the wire. The polymer resin encloses a tow formed from an untwisted bundle of graphite fibers, and the untwisted bundle, together with the polymer resin, is enclosed by an outer jacket of relatively dry, non-resin-impregnated, graphite or aramid fibers.

In some examples, curing the polymer resin may increase bending stiffness of the fiber braid arrangement by a factor of about $10^4$.

In some examples, the method may further include launching, prior to the heating, the arrangement into space in an uncured condition, and subsequently curing the composite fiber braid arrangement by heating the high resistivity metal wire.

In some examples, the outer jacket may be configured as a braided sheath of graphite or aramid fibers.

In some examples, the high resistivity metal wire may be a shape memory alloy. In some examples, the method may further include, prior to heating, training the shape memory alloy, wherein curing results in the metal wire deploying to a trained configuration.

According to some embodiments, a system includes an assembly of structural members, each structural member including a cured, composite fiber braid, each braid including at least one high resistivity metal wire embedded in a polymer resin and at least one optical fiber embedded in the polymer resin and a controller coupled with the metal wires and the optical fibers. Each optical fiber is configured to sense strain at locations along the length of a respective structural member resulting from thermal and/or dynamic loads. The controller is configured to determine a deformation of the respective structural member corresponding to the sensed strain and to control a current through at least one of the metal wires to adjust temperature of at least one structural member responsive to the determined deformations.

In some examples, the optical fibers may be configured as data transmission lines.

In some examples, the polymer resin may enclose a tow formed from an untwisted bundle of graphite fibers, and the untwisted bundle, together with the polymer resin, is enclosed by an outer jacket comprised of relatively dry, non-resin-impregnated, graphite or aramid fibers.

According to some embodiments, for an assembly of structural members, each structural member including a cured, composite fiber braid, each braid including at least one high resistivity metal wire embedded in a polymer resin and at least one optical fiber embedded in the polymer resin, a method for actively controlling alignment of the assembly includes: sensing, with the optical fibers, strain at locations along the lengths of respective structural members resulting from thermal and/or dynamic loads; and, with a controller coupled with the optical fibers determining a deformation of the respective structural members corresponding to the sensed strain and controlling a current through at least one of the metal wires to adjust temperature of at least one structural member responsive to the determined deformations.

In some examples, controlling the alignment may include actively adjusting temperatures of the at least one structural member to obtain or maintain a desired alignment accuracy of the assembly.

In some examples, the optical fibers may be configured as data transmission lines. In some examples, the method further includes transmitting data over the optical fibers.

BRIEF DESCRIPTION OF THE DRAWINGS

Features of the invention are more fully disclosed in the following detailed description of the preferred embodiments, reference being had to the accompanying drawings, in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The present disclosure relates to techniques enabling mechanically stiff structures to be constructed using structural members formed from cured composite fiber braid arrangements. In some embodiments, the composite fiber braid arrangements may be "self-cured", meaning that a polymer resin within which carbon fiber tows are embedded is heated by an electrically heated wire embedded within the polymer resin. For a spacecraft application, the self-curing may, advantageously, be performed on-orbit (i.e., after launch of the spacecraft into orbit) or at a level of assembly for which curing in an autoclave is impractical or undesirable. In some applications, improvements in structural alignment may be achieved by techniques that, in real time, measure and compensate for variations in strain and/or temperature. These techniques may be particularly beneficial for structural arrangements supporting, for example, optical instruments, synthetic aperture payloads and/or antenna reflectors.

Figure 1:
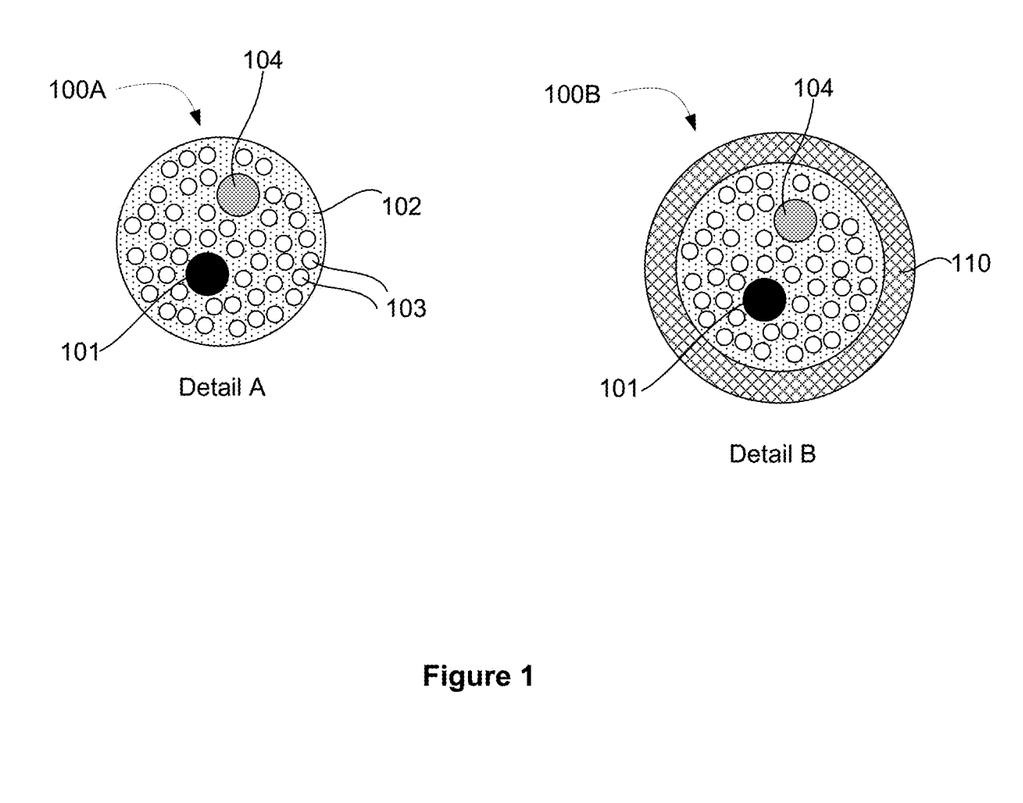
FIG. 1 illustrates cross sectional views of examples of composite fiber braid arrangements according to some embodiments.

FIG. 1 illustrates cross sectional views of examples of composite fiber braid arrangements according to various implementations. It should be appreciated that the cross-sectional views are not to scale. A fiber braid arrangement contemplated by the present disclosure may have a cross-sectional diameter on the order of about ⅛" and may have a length of 10× or more the diameter, for example.

Referring to Detail A, a composite fiber braid arrangement 100A includes at least one high resistivity metal wire 101 and least one fiber optic sensor 104 embedded in a polymer resin system 102, the polymer resin surrounding bundled filaments of graphite fibers 103 forming a tow. The polymer resin 102 may be cured by heating, as a result of which the stiffness of the composite fiber braid arrangement is increased. For example, as a result of curing the resin, the bending stiffness of the fiber braid arrangement may be increased, the cured fiber having a flexural modulus (about $10^7$ lb/in$^2$) about five orders of magnitude higher than uncured fiber (about 103 lb/in$^2$) in some embodiments. In some embodiments, curing is accomplished by applying an electrical potential across a length of the metal wire 101, thereby heating the metal wire and curing the resin.

In some implementations, referring to Detail B, the bundled filaments of graphite fibers, together with the polymer resin, may be enclosed by a jacket 110 of "dry" (non-resin-impregnated) fibers. The jacket 110 may be configured, for example, as a braided sheath of graphite and/or aramid fibers. Advantageously, a coefficient of friction of the dry braided sheath exterior may be considerably lower than a coefficient of friction of the un-jacketed bundled filaments of graphite fiber which greatly improves the handling, tensioning and composite compaction characteristics. In addition, the inner fibers may be over-impregnated with resin such that, during cure, the inner fiber resin will permeate the dry jacket.

Although some of the disclosed techniques are operable with a single metal wire 101 and a single fiber optic sensor 104, for reliability considerations two or more metal wires 101 and two or more fiber optic sensors 104 may be included in a fiber braid arrangement.

Figure 2:
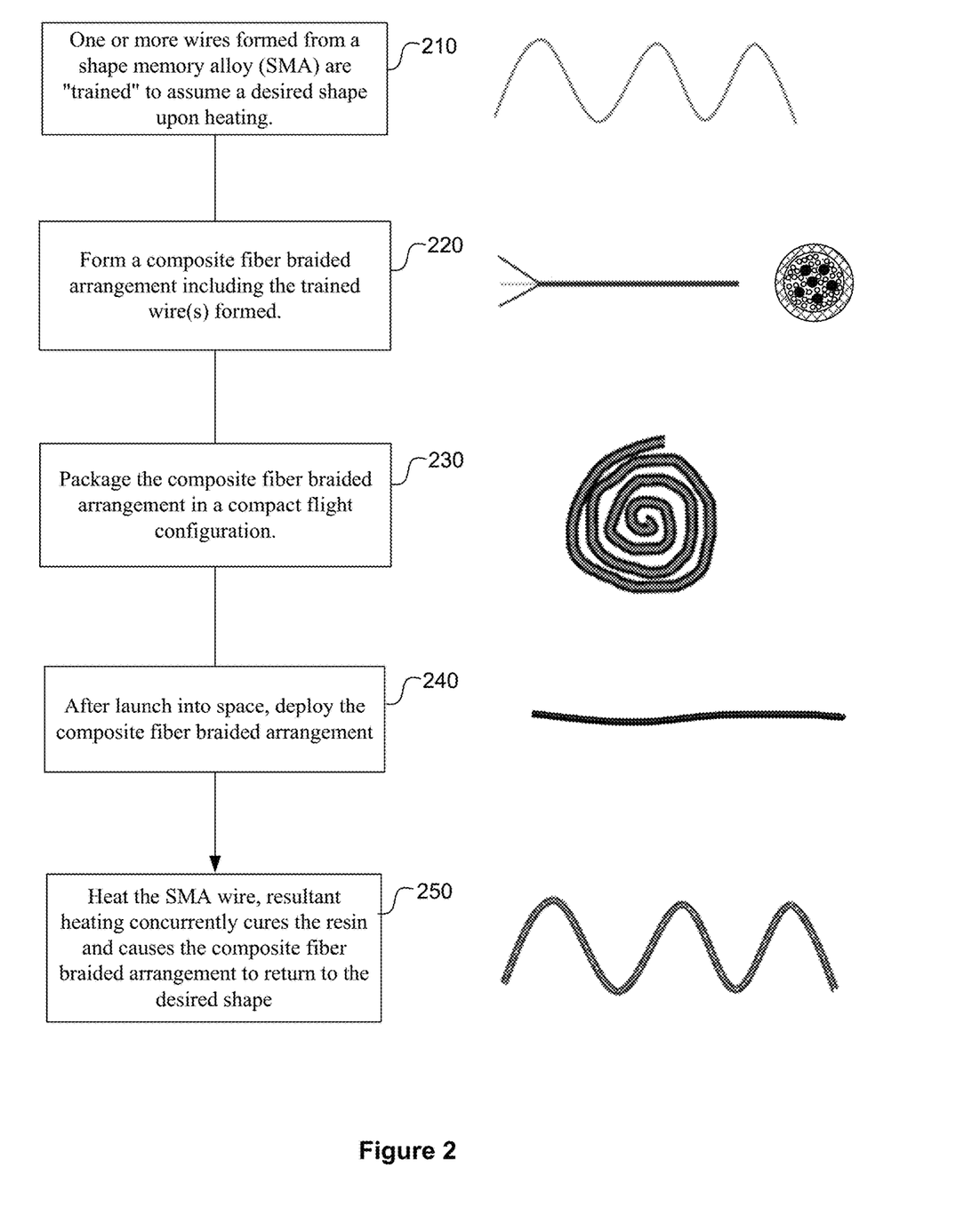
FIG. 2 illustrates an example method of forming a structural element using a composite fiber braided arrangement that includes at least one high resistivity or shape memory alloy wire.

In some embodiments, the metal wire(s) 101 may be formed from a high resistivity metal. Moreover, a shape-memory alloy (SMA) such as nitinol (NiTi) may be used, in some embodiments. FIG. 2 illustrates an example method 200 of forming a structural element using a composite fiber braided arrangement that includes at least one SMA wire. At block 210, one or more wires formed from the shape memory alloy are "taught" or "trained" to assume a desired shape upon heating. At block 220, a composite fiber braided arrangement including the trained wire(s) is formed. At block 230 the composite fiber braided arrangement may be packaged in a compact configuration. At block 240, the composite fiber braided arrangement may be deployed (e.g., unwound from the compact flight configuration). In some embodiments the compact configuration may be configured for compatibility with launch vehicle loads and packaging constraints and the deployment may be executed only after launch. At block 250, current may be run through the SMA wire, and resultant heating may cause the composite fiber braided arrangement to return to the desired shape while concurrently curing the structure to lock it into place. The present inventors have found that properties of the resulting structural member include a low coefficient of thermal expansion and a high strength to mass ratio, resulting from the graphite fiber braid, these properties being greatly superior to conventional SMA deployment structures.

In some embodiments, a lattice and/or a strut-like structural arrangement may be contemplated using structural members of the type described hereinabove. For example, lattice structures employing (GFRP) yarn or tow such as described in U.S. Pat. No. 10,326,209 may be contemplated. In the absence of the presently disclosed techniques, measuring load-induced structural member strain (and resulting structural distortion or misalignment) is difficult or impossible due to the intricate lattice structure and the small size of carbon fiber braid.

This problem may be mitigated by configuring the structural members as fiber braid arrangements, where at least some of the structural members include, as described hereinabove with reference to FIG. 1, one or more optical fibers and one or more high resistivity metal wires embedded in the polymer resin. Post-cure, the optical fiber may be used to sense, in real time, structural distortion that may result from dynamic loads and/or thermal gradients. In such implementations, real time distortion measurement and compensation may enable correction of fine structural distortions or misalignments. As a result, extremely precise alignment may be maintained by appropriately heating the high resistivity wire, responsive to distortions detected by way of the optical fiber.

In some embodiments, each optical fiber may be configured to sense strain at locations along the length of a fiber braid arrangement disposed within the structural member. For example, when illuminated with laser light, the optical fiber may be configured to exhibit an optical fingerprint (backscatter) that changes in a repeatable and predictable way in response to changes in strain and/or temperature. A controller, coupled by way of a sensor with the optical fiber, may be configured to determine a deformation of the structural member corresponding to the exhibited strain. The controller may likewise be electrically coupled with the high resistivity wire and be configured to control a current therethrough to actively control, advantageously, in a closed-loop manner, temperature of the structural member responsive to the determined deformations.

Figure 3A:
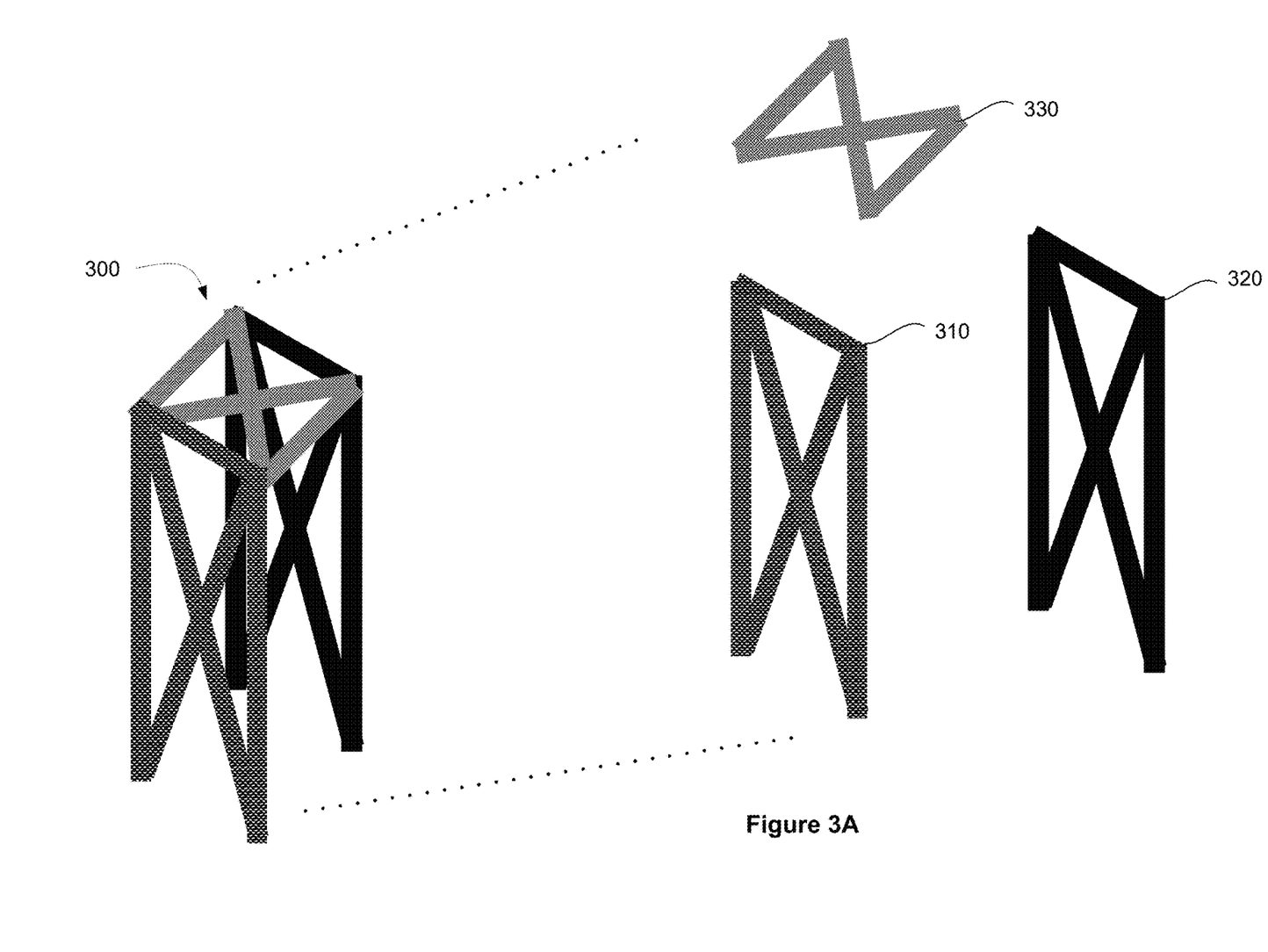
FIG. 3A illustrates a simplified example of a truss structure comprising an assembly of three circuits of laced carbon fiber braid according to some embodiments.

The present techniques may be better appreciated by referring to FIGS. 3A through 3D. FIG. 3A illustrates a simplified example of a truss structure 300 configured comprising an assembly of three circuits of laced carbon fiber braid. In the illustrated example, circuit 310, circuit 320 and circuit 330 may each be formed separately from respective lengths of carbon fiber braid, then assembled, after curing, to form the truss structure 300.

Figure 3B:
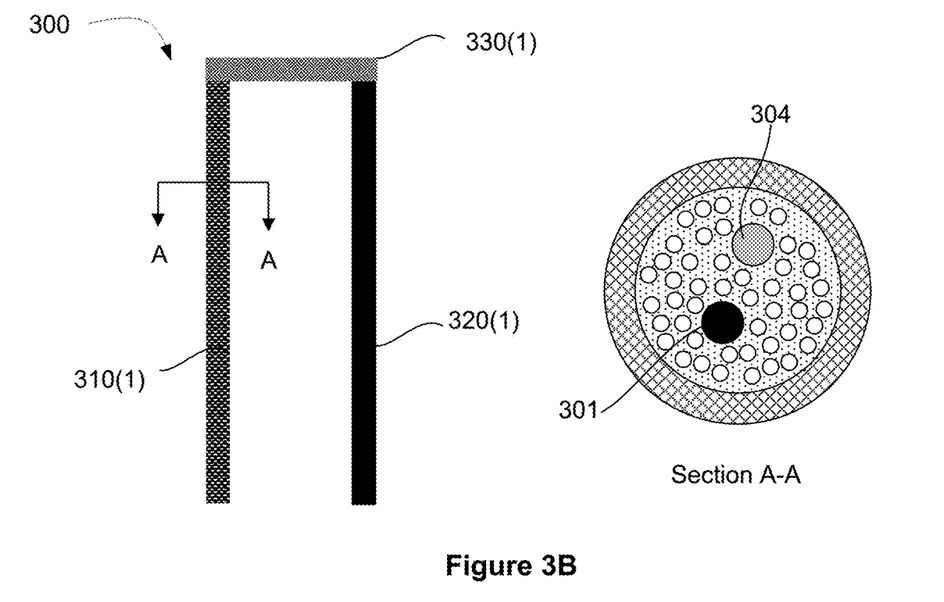
FIG. 3B shows a side view of the truss structure including circuit elements and a sectional view illustrating that the carbon fiber braid includes a high resistivity metal wire and a fiber optic sensor.
Figure 3C:
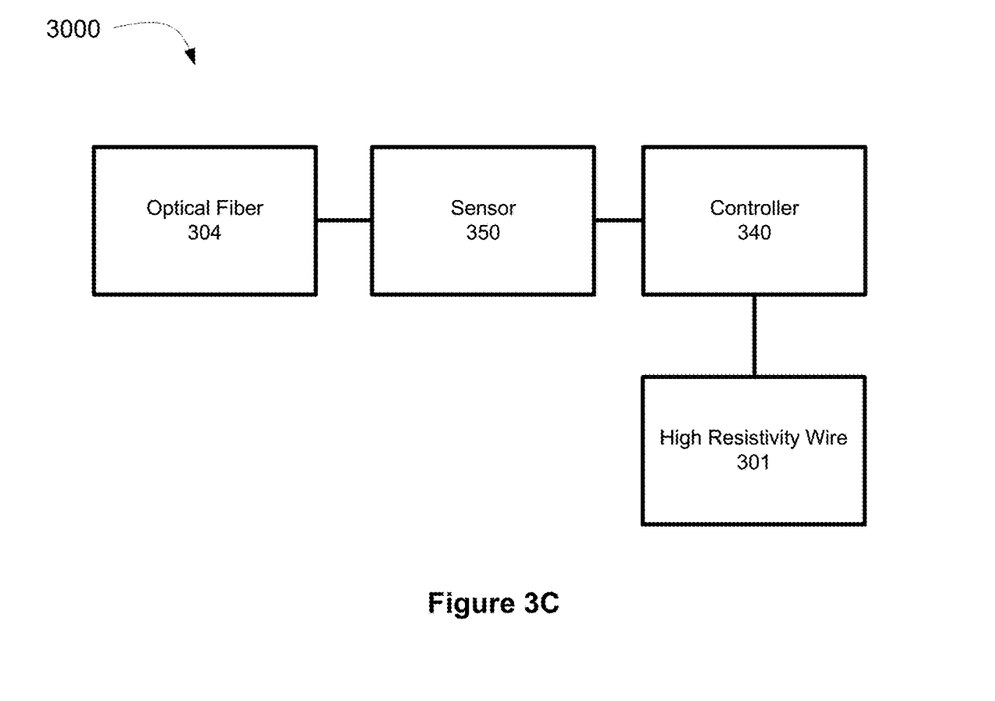
FIG. 3C illustrates a simplified block diagram of a system embodiment.

FIG. 3B shows a side view of truss structure 300, including circuit elements 310(1), 320(1) and 330(1) and a sectional view illustrating that the carbon fiber braid includes a high resistivity metal wire 301 and fiber optic sensor (optical fiber) 304. FIG. 3C illustrates a simplified block diagram of a system embodiment. The system 3000 includes a controller 340 communicatively coupled, by way of sensor 350 with the optical fiber 304. Responsive to information received from sensor 350, the controller 340 may be configured to determine strains on a first structural member within which optical fiber 304 is embedded. The strains may result from dynamic and/or thermal loads. Advantageously, the controller 340 may be configured to select a heating current through the high resistivity wire 301. The high resistivity wire 301 may be embedded in the first structural member, or in a different structural member mechanically associated with the first structural member.

Figure 3D:
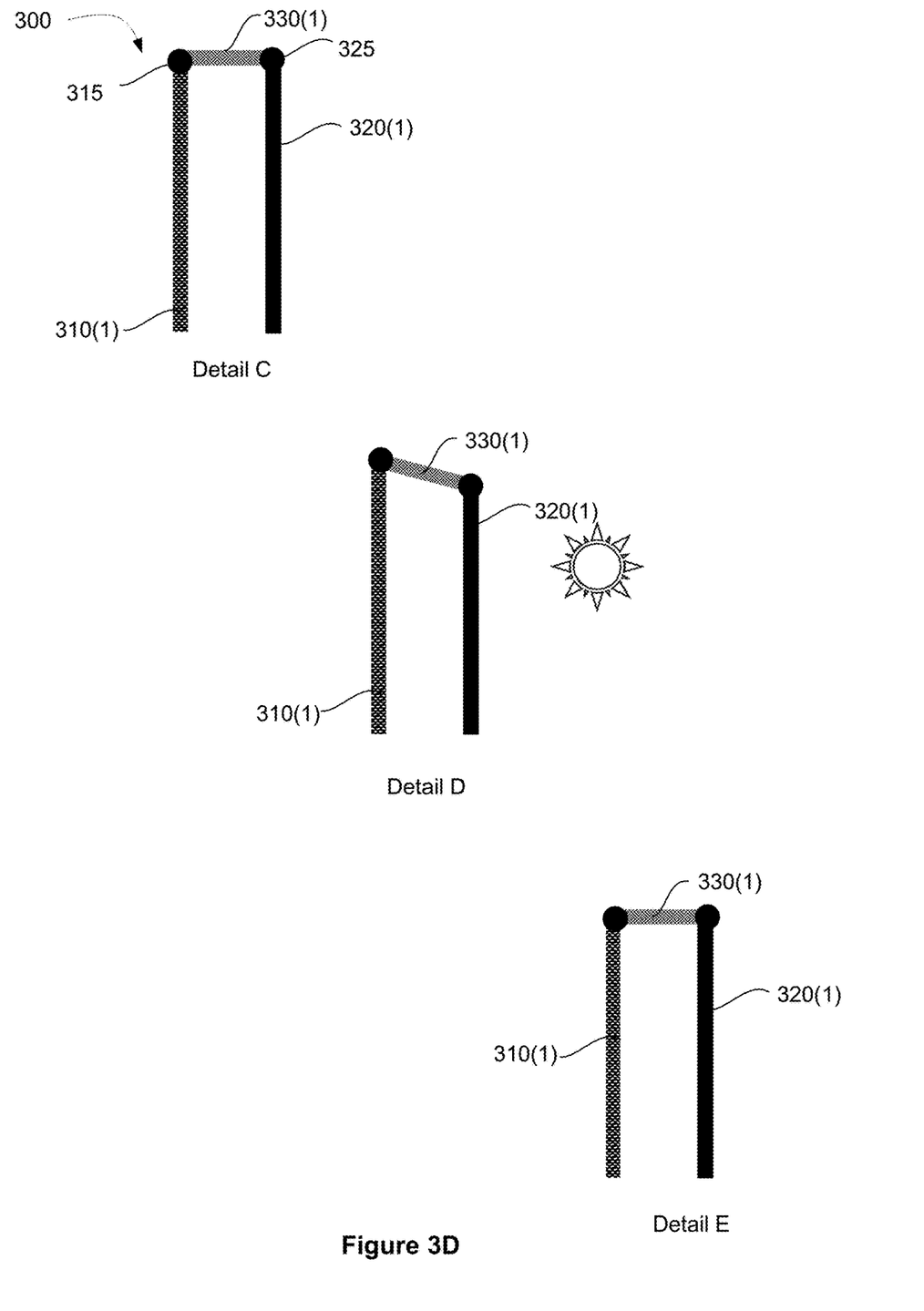
FIG. 3D illustrates an example use case of the present techniques.

FIG. 3D illustrates an example use case of the present techniques, where Detail C shows a side view of truss structure 300. Solar heating may be experienced unequally by different circuits of the truss structure, and such heating may vary over time. In the illustrated example, referring now to Detail D, the second circuit 320 receives more solar incidence than the first circuit 310 and may consequently have a higher temperature. Because of the negative coefficient of thermal expansion exhibited by carbon composite structural elements, the second circuit 320, as a result, may contract relative to the first circuit 310. In the absence of the present techniques, such contraction may cause a distortion or misalignment of the truss structure 300 as shown in Detail D (extent of contraction exaggerated for purposes of illustration) as well as causing 310 and/or other circuits mechanically coupled therewith to exhibit strain. Advantageously, the controller 340 may be configured to detect the exhibited strain, and/or temperature difference between the second circuit 320 and the first circuit 310, and cause application of a heating current to the high resistivity wire 301 of the first circuit 310. As a result, the misalignment may be corrected.

For clarity of illustration, FIG. 3D illustrates a highly simplified structure including only three circuit elements, 310(1), 320(1) and 330(1) coupled by two nodes, 315 and 325. It should be appreciated, however, that fine alignment of a complex structure with any number of nodes and structural elements may advantageously be performed by one or more controllers using the presently disclosed techniques. As a result, real-time, highly precise corrections of misalignments resulting from thermal or dynamic loads may be realized. Moreover, some or all of the optical fibers 304 of such structures may be configured as data transmission paths, in addition to or instead of being configured as strain or temperature sensors.

Figure 4:
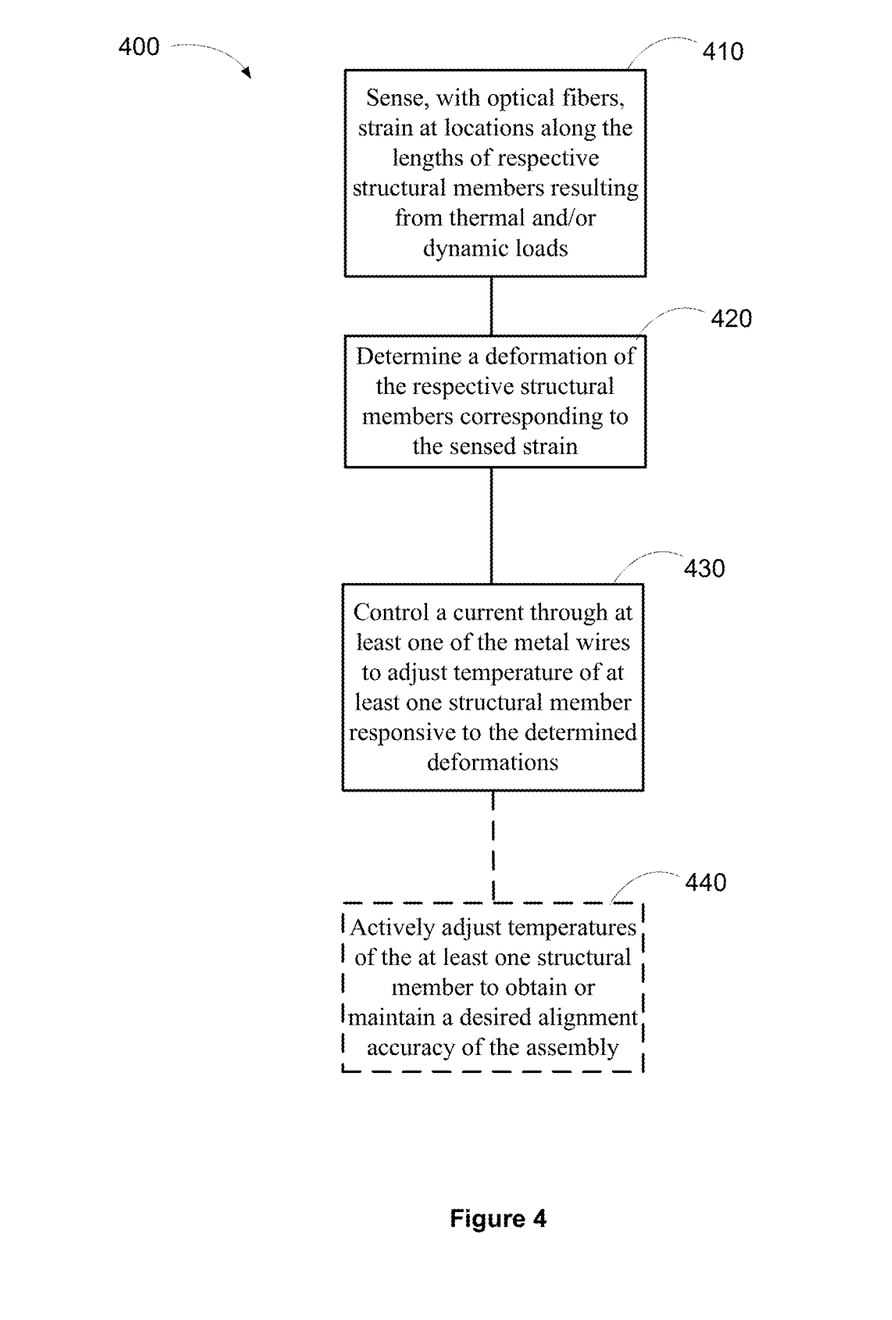
FIG. 4 illustrates a method for actively controlling alignment of an assembly of structural members, according to some embodiments.

Referring now to FIG. 4, a method for actively controlling alignment of an assembly of structural members will be described. As indicated hereinabove, each structural member may include a cured, composite fiber braid, each braid including at least one high resistivity metal wire embedded in a polymer resin and at least one optical fiber embedded in the polymer resin. The method 400 may include a step 410 of sensing, with the optical fibers, strain at locations along the lengths of respective structural members resulting from thermal and/or dynamic loads.

At step 420, using a controller coupled with the optical fibers and with the metal wires, a deformation of the respective structural members corresponding to the sensed strain may be determined; and, at step 430, a current through at least one of the metal wires may be controlled to adjust temperature of at least one structural member responsive to the determined deformations.

In some embodiments, referring still to FIG. 4, the controller may actively adjust temperatures of the at least one structural member to obtain or maintain a desired alignment accuracy of the assembly.

Thus, improved structural arrangements using carbon fiber braid have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. An apparatus, comprising:
a composite fiber braid arrangement, the arrangement including at least one fiber optic sensor embedded in a polymer resin; wherein
the polymer resin encloses a tow formed from an untwisted bundle of graphite fibers, and the untwisted bundle, together with the polymer resin, is enclosed by an outer jacket;
the composite fiber braid arrangement is configured to be highly flexible when uncured, and to be substantially rigid after curing;
prior to curing, the outer jacket is comprised of relatively dry, non-resin-impregnated, graphite or aramid fibers; and
the bundle of graphite fibers is over-impregnated with the polymer resin such that the resin is configured to permeate the outer jacket during cure.

2. The apparatus of claim 1, wherein a coefficient of friction of the outer jacket is substantially lower than a coefficient of friction of the bundle of graphite fibers.

3. The apparatus of claim 1, wherein the outer jacket is configured as a braided sheath of graphite or aramid fibers.

4. The apparatus of claim 1, further comprising a high resistivity metal wire embedded in the polymer resin.

5. The apparatus of claim 4, wherein the high resistivity metal wire is a shape memory alloy.

6. The apparatus of claim 1, wherein the at least one optical fiber is configured as data transmission lines.

7. A system comprising:
an assembly of structural members, each structural member including a cured, composite fiber braid, each braid including at least one high resistivity metal wire embedded in a polymer resin and at least one optical fiber embedded in the polymer resin; and
a controller coupled with the metal wires and the optical fibers; wherein
each optical fiber is configured to sense strain at locations along the length of a respective structural member resulting from thermal and/or dynamic loads; and
the controller is configured to determine a deformation of the respective structural member corresponding to the sensed strain and to control a current through at least one of the metal wires to adjust temperature of at least one structural member responsive to the determined deformations.

8. The system of claim 7, wherein the optical fibers are configured as data transmission lines.

9. The system of claim 7, wherein the polymer resin encloses a tow formed from an untwisted bundle of graphite fibers, and the untwisted bundle, together with the polymer resin, is enclosed by an outer jacket comprised of relatively dry, non-resin-impregnated, graphite or aramid fibers.

10. A method for actively controlling alignment of an assembly of structural members, each structural member including a cured, composite fiber braid, each braid including at least one high resistivity metal wire embedded in a polymer resin and at least one optical fiber embedded in the polymer resin, the method comprising:
sensing, with the optical fibers, strain at locations along the lengths of respective structural members resulting from thermal and/or dynamic loads; and, with a controller coupled with the optical fibers:
determining a deformation of the respective structural members corresponding to the sensed strain; and
controlling a current through at least one of the metal wires to adjust temperature of at least one structural member responsive to the determined deformations.

11. The method of claim 10, wherein controlling the alignment includes actively adjusting temperatures of the at least one structural member to obtain or maintain a desired alignment accuracy of the assembly.

12. The method of claim 10, wherein the optical fibers are configured as data transmission lines.

13. The method of claim 12, further comprising transmitting data over the optical fibers.

* * * * *